United States Patent [19]

Tsuchida et al.

[11] Patent Number: 5,250,657
[45] Date of Patent: Oct. 5, 1993

[54] PROCESS FOR PREPARING POLYARYLENE THIOETHER

[75] Inventors: Eishun Tsuchida; Hiroyuki Nishide; Kimihisa Yamamoto, all of Tokyo; Mitsutoshi Jikei, Saitama; Junya Katoh, Tokyo, all of Japan

[73] Assignee: Seisan Kaihatsu Kagaku Kenkyusho, Kyoto, Japan

[21] Appl. No.: 646,546

[22] Filed: Jan. 29, 1991

[30] Foreign Application Priority Data

Jan. 29, 1990 [JP] Japan ................... 2-20181
Aug. 3, 1990 [JP] Japan ................... 2-207353

[51] Int. Cl.$^5$ .................. C08G 75/00; C08G 75/20
[52] U.S. Cl. ........................ 528/383; 528/373; 528/381; 528/385
[58] Field of Search ............ 528/373, 381, 383, 385

[56] References Cited

U.S. PATENT DOCUMENTS

| | | | |
|---|---|---|---|
| 4,605,713 | 8/1986 | Heitz et al. | 528/388 |
| 4,605,732 | 8/1986 | Heitz et al. | 528/388 |
| 4,882,415 | 11/1989 | Hunziker | 528/360 |

FOREIGN PATENT DOCUMENTS

| | | |
|---|---|---|
| 1589417 | 3/1970 | European Pat. Off. |
| 0281036 | 9/1988 | European Pat. Off. |

OTHER PUBLICATIONS

D. Klamann in Houben-Weyl 'Methoden Der Organischen Chemie Teil 1, Band E11 Organische Schwefel Verbindungen'; 1985, Thieme Verlag, Stuttgart, p. 135, parg. 4.

Journal of Polymer Science, Polymer Letters Edition, vol. 8, No. 1, Jan. 1970, New York, pp. 19-24, T. Fujisawa and M. Kakutani: 'Preparation of Poly (Arylene Sulfides) by Iron-Catalyzed Aromatic Sulfuration with Sulfur Chlorides'.

Journal of the Chemical Society, Chemical Communications, 17 Apr. 1991 Letchworth GB, E. Tsuchuda et al., 'One-Pot Synthesis of Poly(Thioarylene)s: Predominant Sulphide Bond Formation Through Oxidative and Electrophilic Reaction'.

World Patents Index Latest, Derwent, AN-84-303725 and JP-A-59189124 (Nippon Soda) 26 Oct. 1984.

*Primary Examiner*—John Kight, III
*Assistant Examiner*—T. Mosley
*Attorney, Agent, or Firm*—Wenderoth, Lind & Ponack

[57] ABSTRACT

Polyarylene thioether is easily prepared by oxidative polymerizing an aromatic compound of the formula:

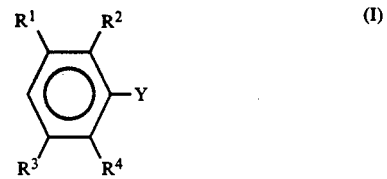

(I)

wherein $R^1$, $R^2$, $R^3$ and $R^4$ are independently a hydrogen atom, a halogen atom, a lower alkyl group or a lower alkoxy group, and Y is a hydrogen atom or a group of the formula:

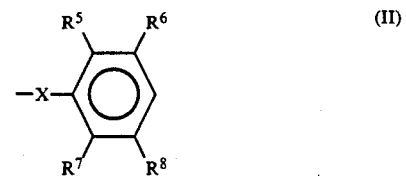

(II)

wherein $R^5$, $R^6$, $R^7$ and $R^8$ are independently a hydrogen atom, a halogen atom, a lower alkyl group or a lower alkoxy group and X is —O—, —S—, a methylene group or an ethylene group with a sulfidizing agent in the presence of an acid and an oxidizing agent, or in the presence of an acid, a catalyst for oxidative polymerization and oxygen, or in the presence of a Friedel-Crafts catalyst.

11 Claims, No Drawings

PROCESS FOR PREPARING POLYARYLENE THIOETHER

BACKGROUND OF THE INVENTION

1. Field of the Invention

The present invention relates to a process for preparing polyarylene thioether. More particularly, the present invention relates to a process which easily produces polyarylene thioether such as polyphenylene thioether, polyphenylene ether-thioether, polyphenylmethylenephenylene thioether, polyphenylethylenephenylene thioether, and the like under mild polymerization conditions at a low cost.

2. Description of Related Art

Hitherto, polyarylene thioether such as polyphenylene thioether is prepared by condensation polymerizing a dihalogenoaromatic compound with a sulfide of an alkali metal in a polar solvent at high temperature under high pressure. This process has various problems that (1) an alkali metal salt remains in the produced polyarylene thioether and deteriorates electrical properties of the polymer, and (2) since the polymerization is carried out at high temperature and high pressure, an amount of consumed energy is large so that a production cost is high.

Also, a process utilizing sulfuric acid as a catalyst is known. However, in this process, large amounts of by-products are produced, and a large amount of cross linked polymer is produced. As processes for preparing polyarylene thioether by using diphenyldisulfide and/or thiophenol are known from Japanese Patent Kokai Publication Nos. 213526/1988 and 213527/1988. These processes have drawbacks that expensive Lewis acid and an oxidizing agent are used in large amounts, and that diphenyldisulfide and thiophenol which are used as monomers are expensive.

SUMMARY OF THE INVENTION

One object of the present invention is to provide a process for preparing polyarylene thioether, which can overcome the problems and the drawbacks of the conventional processes.

Another object of the present invention is to provide a process for easily preparing polyarylene thioether with good electrical, physical and chemical properties, in particular, substantially linear polyarylene thioether and its alternating copolymer with ether, methylene or ethylene, which contain a smaller amount of by-produced cross-linked polymer under mild conditions at a low cost.

According to a first aspect of the present invention there is provided a process for preparing polyarylene thioether comprising oxidative polymerizing an aromatic compound of the formula:

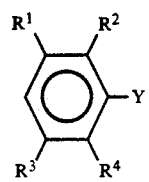

(I)

wherein $R^1$, $R^2$, $R^3$ and $R^4$ are independently a hydrogen atom, a halogen atom, a lower alkyl group or a lower alkoxy group, and Y is a hydrogen atom or a group of the formula:

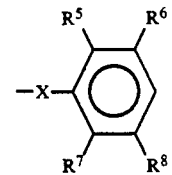

(II)

wherein $R^5$, $R^6$, $R^7$ and $R^8$ are independently a hydrogen atom, a halogen atom, a lower alkyl group or a lower alkoxy group and X is —O—, —S—, a methylene group or an ethylene group with a sulfidizing agent in the presence of an acid and an oxidizing agent.

According to a second aspect of the present invention, there is provided a process for preparing polyarylene thioether comprising oxidative polymerizing the compound of the formula (I) with a sulfidizing agent in the presence of an acid, a catalyst for oxidative polymerization and oxygen.

According to a third aspect of the present invention, there is provided a process for preparing polyarylene thioether comprising oxidative polymerizing the compound of the formula (I) with a sulfidizing agent in the presence of a Friedel-Crafts catalyst.

DETAILED DESCRIPTION OF THE INVENTION

In the general formula (I), $R^1$ to $R^8$ independently represent a hydrogen atom, a halogen atom, a lower alkyl group and a lower alkoxy group.

Herein, the halogen atom includes a fluorine atom, a chlorine atom, a bromine atom and an iodine atom.

The lower alkyl group means an alkyl group having 1 to 10 carbon groups. Examples of the lower alkyl group are a methyl group, an ethyl group, a propyl group, a 1-methylethyl group, a butyl group, a 1-methylpropyl group, a 2-methylpropyl group, a 1,1-dimethylethyl group, a pentyl group, a hexyl group, a heptyl group, an octyl group, etc.

The lower alkoxy group means an alkoxy group having 1 to 8 carbon atoms. Examples of the alkoxy group are a methoxy group, an ethoxy group, a propoxy group, an isopropoxy group, a butoxy group, an isobutoxy group, a sec.-butoxy group, a tert.-butoxy group, a pentyloxy group, a hexyloxy group, etc.

Among them, the hydrogen atom, the lower alkyl groups such as the methyl group and the ethyl group and the lower alkoxy groups such as the methoxy group and the ethoxy group are preferred. In particular, the hydrogen atom, the methyl group, the ethyl group and the methoxy group are preferred.

In the process of the present invention, one or more of the aromatic compounds (I) are homo- or co-polymerized to produce polyarylene thioethers having various structures, namely homopolymers, copolymers and mixtures or compositions thereof.

By the process of the present invention, generally, a linear polyarylene thioether comprising repeating units of the formula:

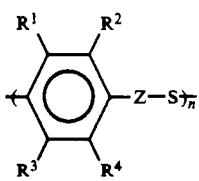

(III)

wherein $R^1$ to $R^4$ are the same as defined above and Z is a single bond or a group of the formula:

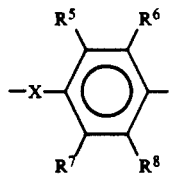

(IV)

in which $R^5$, $R^6$, $R^7$ and $R^8$ and X are the same as defined above can be prepared. The prepared polyarylene thioether has a very low cross-linking degree.

Examples of the aromatic (I) in which Y is the hydrogen atom are benzene, toluene, p-xylene, p-ethyltoluene, m-ethyltoluene, p-isopropyltoluene, m-isopropyltoluene, p-n-propyltoluene, p-methoxytoluene, m-methoxytoluene, diethylbenzene, dipropylbenzene, dimethoxybenzene, anisole, trimetylbenzene, tetramethylbenzene, etc. Among them, p-disubstituted aromatic compounds having the lower alkyl and/or alkoxy group such as p-xylene and p-dimethoxybenzene are preferred to prepare the linear polymer having a large molecular weight.

Examples or the aromatic compound (I) in which Y is the group of the formula (II) are dipheylethers (e.g. diphenyl ether, 2-methyldiphenyl ether, 3-methyldiphenyl ether, 2,3-dimethyldiphenyl ether, 2,5-dimethyldiphenyl ether, 2,6-dimethyldiphenyl ether, 3,5-dimethyldiphenyl ether, 2,2'-dimethyldiphenyl ether, 2,3'-dimethyldiphenyl ether, 3,3'-dimethyldiphenyl ether, 2,3,5-trimethyldiphenyl ether, 2,3,6-trimethyldiphenyl ether, 2,2',3-trimethyldiphenyl ether, 2,2',5-trimethyldiphenyl ether, 2,2',6-trimethyldiphenyl ether, 2,3',3-trimethyldiphenyl ether, 2,3',5-trimethyldiphenyl ether, 2,3',6-trimethyldiphenyl ether, 3,3',5-trimethyldiphenyl ether, 2,3,5,6-tetramethyldiphenyl ether, 2,2',3,3'-tetramethyldiphenyl ether, 2,2',3,5'-tetramethyldiphenyl ether, 2,2',3,6'-tetramethyldiphenyl ether, 2,3,3',5'-tetramethyldiphenyl ether, 2,2',5,5'-tetramethyldiphenyl ether, 2,2',5,6'-tetramethyldiphenyl ether, 2,3',5,5'-tetramethyldiphenyl ether, 2,3',5',6-tetramethyldiphenyl ether, 2,2',3,5-tetramethyldiphenyl ether, 2,2',3,6-tetramethyldiphenyl ether, 2,3,3',6-tetramethyldiphenyl ether, 2,2',3,3',5-pentamethyldiphenyl ether, 2,2',3,5,5'-pentamethyldiphenyl ether, 2,2',3,5,6'-pentamethyldiphenyl ether, 2,3,3',5,5'-pentamethyldiphenyl ether, 2,2',3,3',6-pentamethyldiphenyl ether, 2,2',3,5',6-pentamethyldiphenyl ether, 2,2',3,6,6'-pentamethyldiphenyl ether, 2,3,3',5',6-pentamethyldiphenyl ether, 2,2',3,3',5,5'-hexamethyldiphenyl ether, 2,2',3,3',5,6'-hexamethyldiphenyl ether, 2,2',3,3',5,5',6-heptamethyldiphenyl ether, 2,2',3,3',5,6,6'-heptamethyldiphenyl ether, 2,2',3,3',5,5',6,6'-octamethyldiphenyl ether, 2,2'-diethyldiphenyl ether, 3,3'-diethyldiphenyl ether, 2,2',5,5'-tetraethyldiphenyl ether, 3,3',5,5'-tetraethyldiphenyl ether, 3,3',5,5'-tetraethyldiphenyl ether, 2,2'-difluorodiphenyl ether, 2,2'-dichlorodiphenyl ether, 2,2'-dibromodiphenyl ether, 2,2'-diiododiphenyl ether, 2,2',5,5'-tetrafluorodiphenyl ether, 2,2',5,5'-tetrachlorodiphenyl ether, 2,2',5,5'-tetrabromodiphenyl ether, 3,3'-dimethoxydiphenyl ether, 2,2',5,5'-tetramethoxydiphenyl ether, 3,3',5,5'-tetramethoxydiphenyl ether, 3,3'-diethoxydiphenyl ether, 2,2',5,5'-tetraethoxydiphenyl ether, 3,3',5,5'-tetraethoxydiphenyl ether, 3,3'-dipropoxydiphenyl ether, 2,2',5,5'-tetrapropoxydiphenyl ether, 3,3',5,5'-tetrapropoxydiphenyl ether, 3,3'-dibutoxydiphenyl ether, etc.); diphenylsulfides (e.g. diphenylsulfide, 2-methyldiphenylsulfide, 3-methyldiphenylsulfide, 2,3-dimethyldiphenylsulfide, 2,5-dimethyldiphenylsulfide, 2,6-dimethyldiphenylsulfide, 3,5-dimethyldiphenylsulfide, 2,2'-dimethyldiphenylsulfide, 2,3'-dimethyldiphenylsulfide, 3,3'-dimethyldiphenylsulfide, 2,3,5-trimethyldiphenylsulfide, 2,3,6-trimethyldiphenylsulfide, 2,2',3-trimethyldiphenylsulfide, 2,2',5-trimethyldiphenylsulfide, 2,2',6-trimethyldiphenylsulfide, 2,3',3-trimethyldiphenylsulfide, 2,3',5-trimethyldiphenylsulfide, 2,3',6-trimethyldiphenylsulfide, 3,3',5-trimethyldiphenylsulfide, 2,3,5,6-tetramethyldiphenylsulfide, 2,2',3,3'-tetramethyldiphenylsulfide, 2,2',3,5'-tetramethyldiphenylsulfide, 2,2',3,6'-tetramethyldiphenylsulfide, 2,3,3',5'-tetramethyldiphenylsulfide, 2,2',5,5'-tetramethyldiphenylsulfide, 2,2',5,6'-tetramethyldiphenylsulfide, 2,3',5,5'-tetramethyldiphenylsulfide, 2,3',5',6-tetramethyldiphenylsulfide, 2,2',3,5-tetramethyldiphenylsulfide, 2,3,3',5-tetramethyldiphenylsulfide, 2,2',3,6-tetramethyldiphenylsulfide, 2,3,3',6-tetramethyldiphenylsulfide, 2,2',3,3',5-pentamethyldiphenylsulfide, 2,2',3,5,5'-pentamethyldiphenylsulfide, 2,2',3,5,6'-pentamethyldiphenylsulfide, 2,3,3',5,5'-pentamethyldiphenylsulfide, 2,2',3,3',6-pentamethyldiphenylsulfide, 2,2',3, 5',6-pentamethyldiphenylsulfide, 2,2',3,6,6'-pentamethyldiphenylsulfide, 2,3,3',5',6-pentamethyldiphenylsulfide, 2,2',3,3',5,5'-hexamethyldiphenylsulfide, 2,2',3,3',5,6'-hexamethyldiphenylsulfide, 2,2',3,3',5,5',6-heptamethyldiphenylsulfide, 2,2',3,3',5,6,6'-heptamethyldiphenylsulfide, 2,2',3,3',5,5',6,6'-octamethyldiphenylsulfide, 2,2'-diethyldiphenylsulfide, 3,3'-diethyldiphenylsulfide, 2,2',5,5'-tetraethyldiphenylsulfide, 3,3',5,5'-tetraethyldiphenylsulfide, 2,2'-difluorodiphenylsulfide, 2,2'-dichlorodiphenylsulfide, 2,2'-dibromodiphenylsulfide, 2,2'-diiododiphenylsulfide, 2,2',5,5'-tetrafluorodiphenylsulfide, 2,2',5,5'-tetrachlorodiphenylsulfide, 2,2',5,5'-tetrabromodiphenylsulfide, 3,3'-dimethoxydiphenylsulfide, 2,2',5,5'-tetramethoxydiphenylsulfide, 3,3',5,5'-tetramethoxydiphenylsulfide, 3,3'-diethoxydiphenylsulfide, 2,2',5,5'-tetraethoxydiphenylsulfide, 3,3',5,5'-tetraethoxydiphenylsulfide, 3,3,-dipropoxydiphenylsulfide, 2,2',5,5'-tetrapropoxydiphenylsulfide, 3,3',5,5'-tetrapropoxydiphenylsulfide, 3,3'-dibutoxydiphenylsulfide, etc.); diphenylmethanes (e.g. diphenylmethane, 3,3'-dimethyldiphenylmethane, 2,2'5,5'-tetramethyldiphenylmethane, 3,3',5,5'-tetramethyldiphenylmethane, 3,3'-diethyldiphenylmethane, 2,2',5,5'-tetraethyldiphenylmethane, 3,3',5,5'-tetraethyldiphenylmethane, 3,3'-dimethoxydiphenylmethane, 2,2',5,5'-tetramethoxydiphenylmethane, etc.); and dibenzyls (e.g. dibenzyl, 3,3'-dimethyldibenzyl, 2,2',5,5'-tetramethyldibenzyl, 3,3',5,5'-tetramethyldibenzyl, 3,3'-diethyldibenzyl, 2,2',5,5'-tetramethyldibenzyl, 3,3',5,5'-tetraethyldibenzyl, 3,3'-dimethoxydibenzyl, 2,2',5,5'-tetramethoxydibenzyl, 3,3',5,5'-tetramethoxydibenzyl, etc.). Among them, diphenyl ether, 2,2',5,5'-tetramethyldiphenyl ether, 3,3',5,5'-tetramethyldiphenyl ether, diphenylsulfide, 2,2',5,5'-tetramethyldiphenylsulfide, 3,3',5,5'-tetramethyldiphenylsulfide, 2,2',5,5'-tetramethyldiphenylmethane, 3,3',5,5'-tetramethyldiphenylmethane, dibenzyl, 2,2',5,5'-tetramethyldibenzyl and 3,3',5,5'-tetramethyldibenzyl are preferred to prepare the linear polymer having a large molecular weight.

As the sulfidizing agent to be used in the present invention, halogenated sulfur compounds such as dichlorodisulfide are preferably used. The dichlorodisulfide can be easily synthesized from sulfur and chlorine gas. By using this preparation manner, the polyarylene thioether can be prepared by directly using sulfur and the chlorine gas.

As the oxidizing agent to be used in the present invention, any oxidizing agent that can oxidize diphenyldisulfide and does not interfere the polymerization reaction can be used.

Specific examples of the oxidizing agent are organic oxidizing agents (e.g. dichlorodicyanobenzoquinone, chloranil, bromanil, 1,4-diphenoquinone, tetramethyldiphenoquinone, tetracyanoquinodimethane, tetracyanoethylene, thionyl chloride, etc.); organic peroxides (e.g. perbenzoic acid, m-chloroperbenzoic acid, benzoyl peroxide, etc.); lead tetraacetate, thallium triacetate, acetylacetonatocerium (IV), vanadium pentoxide, and the like. Among them, 2,3-dichloro-5,6-dicyano-p-benzoquinone, chloranil, bromanil and vanadium pentoxide are preferred.

The oxidizing agents may be used independently or as a mixture of two or more of them.

An amount of the oxidizing agent [A] varies with the raw materials to be used and kinds of a solvent and the oxidizing agent. In general, a molar ratio of the amount of the oxidizing agent to a smaller one of amounts of the aromatic compound (I) [B] and the sulfidizing agent [C], namely [A]/([B] or [C]) is from 0.1 to 50, preferably from 0.5 to 5.

When this molar ratio is less than 0.1, the polymerization rate becomes small, and an yield of the polymer tends to decrease. When this molar ratio exceeds 50, the effects do not correspond to the excessive amount.

As the oxidative polymerization catalyst used in the process of the second aspect of the present invention, salts of the VA and VIA group metal elements of the Periodic Table are preferred. There is no specific limitation on kinds of ligands and counter ions. Among them, salts with acetylacetone and porphyrin are preferred.

Specific examples of the salts of the VA and VIA group metals are vanadium compounds (e.g. vanadylacetylacetonato (VO(acac)$_2$), vanadyltetraphenylporphyrin (VOTPP), acetylacetonatovanadium (V(acac)$_3$), etc.) and molybdenum oxide compounds (e.g. acetylacetonatomolybdenum oxide (MoO$_2$(acac)$_2$), molybdemum (IV) oxide, etc.).

Among them, vanadylacetylacetonato (VO(acac)$_2$), vanadyltetraphenylporphyrin (VOTPP), acetylacetonatovanadium (V(acac)$_3$) are preferred.

The above metal salts are used independently or as a mixture or a complex of two or more of them.

The polymerization in the process of the second aspect does not proceed in the absence of oxygen such as in a nitrogen atmosphere. The atmospheric pressure is sufficient for the present invention, though the higher oxygen partial pressure is preferred. Insofar as oxygen is present, the polymerization reaction proceeds even under reduced pressure.

In the process of the first aspect of the present invention, oxygen is not necessarily required since diphenyldisulfide is oxidized with the oxidizing agent.

A molar ratio of an amount of the oxidative polymerization catalyst [D] to a smaller one of amounts of the aromatic compound (I) [B] and the sulfidizing agent [C], namely [D]/([B] or [C]) is from 5 to 0.00001, preferably from 0.1 to 0.001.

When this molar ratio is less than 0.00001, the polymerization rate is too small. When this ratio exceeds 5, the cost of the catalyst is too large and the process is uneconomical.

As the Friedel-Crafts catalyst, any of conventional ones can be used. Specific examples of the Friedel-Crafts catalyst are antimony pentachloride, aluminum chloride, titanium tetrachloride, iron, silica gel, alumina, diphosphorus pentoxide, and the like. Among them, antimony pentachloride is preferred.

An amount of the Friedel-Crafts catalyst [E] varies with the raw material to be used and kinds of the solvent and the Friedel-Crafts catalyst. In general, a molar ratio of the amount of the Friedel-Crafts catalyst to a smaller one of amounts of the aromatic compound (I) [B] and the sulfidizing agent [C], namely [E]/([B] or [C]) is from 0.00001 to 50, preferably from 0.001 to 5.

When this molar ratio is less than 0.00001, the polymerization rate is too small, and the yield of the polymer tends to decrease. When this ratio exceeds 5, the effects do not correspond to the excessive amount.

The acid to be used in the processes of the first and second aspects of the present invention suppresses deactivation of polymerization active species, and is a protonic acid or a compound at least a part of which is converted to a protonic acid in the presence of a proton donor. The acid includes conventional organic acids, inorganic acids and mixtures or complexes thereof.

Specific examples of the acid are non-oxoacids (e.g. hydrochloric acid, hydrobromic acid, prussic acid, etc,); inorganic oxoacids (e.g. sulfuric acid, phosphoric acid, chloric acid, bromic acid, nitric acid, carbonic acid, boric acid, molybdic acid, isopoly acid, heteropoly acid, etc.); partial salts or esters of sulfuric acid (e.g. sodium hydrogensulfate, sodium dihydrogenphosphate, proton-remaining heteropoly acid salts, monomethyl sulfate, trifluoromethyl sulfate, etc.); compounds which act as protonic acids when they are dissolved in a solvent or decomposed (e.g. ammonium chloride, ammonium phosphate, ammonium sulfate, ammonium heteropoly acid, etc.); mono- or poly-basic carboxylic acids (e.g. acetic acid, propionic acid, butanoic acid, succinic acid, benzoic acid, phthalic acid, etc.); halogenated carboxylic acids (e.g. monochloroacetic acid, dichloroacetic acid, trichloroacetic acid, monofluoroacetic acid, difluoroacetic acid, trifluoroacetic acid, etc.); mono- or poly-basic sulfonic acids (e.g. methanesulfonic acid, ethanesulfonic acid, propanesulfonic acid, benzenesulfonic acid, toluenesulfonic acid, trifluoromethanesulfonic acid, benzenedisulfonic acid, etc.); partial metal salts of polybasic sulfonic acids (e.g. sodium benzenedisulfonate, etc.) and the like.

Among them, strong acidic protonic acids which are stable and non-volatile, in particular, sulfuric acid, trifluoroacetic acid and trifluoromethanesulfonic acid are preferred.

The acids may be used independently or as a mixture of two or more of them.

Although the polymerization reaction according to the present invention may be carried out in the absence of a solvent, usually it is carried out in a solvent.

As the solvent, any solvent that does not substantially deactivate the polymerization activity may be used.

Usually, one in that the raw materials, sulfur and the acid are dissolved is preferred.

Examples of the solvent are nitromethane, dichloromethane, dibromoethane, tetrachloroethane, nitrobenzene and the like. In addition, solvents which are used in conventional Friedel-Crafts reactions or cationic polymerization may be used.

The aromatic compound (I) as such may act as a solvent.

The solvents may be used independently or as a mixture thereof. Further, other inactive solvent may be used, if required.

Different from the process of the first aspect of the present invention, in the process of the second aspect of the present invention, since water is by-produced as the polymerization proceeds, it is preferred to use a dehydrating agent. Suitable examples of the dehydrating agent are carboxylic acid anhydrides such as acetic anhydride, trifluoroacetic anhydride, trifluoromethanesulfonic anhydride, etc. In addition, other dehydrating agents which have no influence on the polymerization reaction such as anhydrous sodium sulfate or calcium chloride may be used.

A concentration of the raw materials, namely a total concentration of the aromatic compound (I) and the sulfidizing agent is not limited. When the aromatic compound (I) and the sulfidizing agent are in the liquid state at the polymerization temperature, the bulk polymerization in which the raw materials themselves serve as the solvent is possible. In general, the concentration of the raw materials is at least $10^{-4}$ mol/l when the solvent is used.

The amounts of the acid and the dehydrating agent vary with the kind and composition of the acid, the kinds of the raw materials and the solvent, the concentration of impurities such as water in the reaction system, and the reaction conditions such as temperature. Concentrations of the acid and the dehydrating agent are so selected that the polymerization can be initiated and side reactions other than the polymerization reaction are suppressed.

The presence of water has various influence on the polymerization, that is, water may increase the polymerization rate or decrease the polymerization activity. When the concentration of water exceeds a certain value, the polymerization activity is significantly decreased. Therefore, the water concentration should not exceed such value. The maximum concentration of water varies with the kinds of the acid and the solvent to be used.

A reaction temperature depends on the kinds of the acid and the raw materials. Usually, the reaction temperature is from $-25°$ to $+250°$ C., preferably from $0°$ to $150°$ C. In some cases, $0°$ to $50°$ C. is preferred.

There is no specific limitation on the reaction pressure and the partial pressure of oxygen. The reaction pressure may be atmospheric pressure or autogenous pressure of the reaction system. If necessary, the reaction pressure may be increased by the use of a diluting gas which has no influence on the polymerization reaction.

A reaction time greatly varies with the kinds and ratio of the acid and the raw materials, the reaction temperature, the partial pressure of oxygen, the amount of the catalysts and the kind of the solvent. Usually, the reaction time is from 0.5 to 100 hours, preferably from 2 to 50 hours.

There is no specific limitation on a sequence and manner for adding the oxidizing agent, the oxidative polymerization catalyst or the Friedel-Crafts catalyst, the aromatic compound, the sulfidizing agent and the optional solvent. They may be added to a reactor simultaneously, or continuously or stepwise in any sequence.

The polymerization can be carried out in a homogeneous or heterogeneous multiphase system or in a slurry.

The reaction mode is not critical, and may be continuous, semi-continuous or batchwise. In the batchwise reaction, the reaction mixture is preferably stirred.

The produced polyarylene thioether may be posttreated by a conventional manner. One example of the post-treatment in case of solution polymerization will be explained.

After the polymerization is completed or reaches an intended polymerization degree, the reaction mixture is contacted with water, a lower alcohol such as methanol or a mixture thereof to deactivate the catalyst and precipitate the polymer. If necessary, a terminator such as a basic compound can be used.

In the above treatment, the reaction mixture is not necessarily contacted with a poor solvent or the basic compound. When the polymer separates out in the solvent during polymerization, it can be separated and dried with continuing the polymerization.

The precipitated polymer is recovered from the liquid by a separation method, for example, filtration. If necessary, the separated polymer is washed and/or neutralized with a washing liquid such as an aqueous alkali solution and optionally redissolved in a solvent, reprecipitated with a precipitation liquid, separated and washed with methanol for necessary times, followed by drying to recover the polymer with various purities.

As the solvent for dissolving the polymer, N-methylpyrrolidone is preferably used since the polymer is well dissolved in it.

As the reprecipitating and washing liquid, water, methanol, carbon disulfide or a mixture thereof is preferably used. In particular, methanol is preferred.

From the reaction mixture from which the polymer is separated, the unreacted raw materials, by-produced low molecular weight compounds, the solvent and the like are purified and recovered by a conventional distillation procedure and recycled to the reaction system or used in the post-treatment or other applications.

The polyarylene thioether such as polyphenylene thioether is good in heat resistance and chemical resistance and has good physical properties such as toughness, strength, impact resistance, wear resistance, etc. In particular, since the polyarylene thioether prepared by the process of the present invention contains no salt such as sodium chloride that will deteriorate insulating properties, it has excellent electrical characteristics such as insulation. In addition, since the polymer has a linear structure, it is a kind of engineering plastics having good processability. Therefore, the polyarylene thioether prepared by the process of the present invention can be used as mechanical parts or raw materials in various fields such as electronic and electric, machinery, coating, automobile and chemistry fields.

PREFERRED EMBODIMENTS OF THE INVENTION

The present invention will be explained in detail by following Examples.

Example 1

In a nitrogen atmosphere, dichlorodisulfide (3.38 g) was dissolved in p-xylene (50 ml) and mixed with a solution of 2,3-dichloro-5,6-dicyano-p-benzoquinone (5.7 g) and trifluoroacetic acid (11.4 g) in tetrachloroethane (50 ml). Then, the mixture was stirred for 2 hours. The reaction solution was dropwise added in methanol acidified with hydrochloric acid to precipitate a white product, which was washed and dried to obtain poly(2,5-dimethylphenylene sulfide) (6.34 g) as a white powder. Yield: 93% based on sulfur. Melting point: 270° C.

Elemental analysis (%): Calculated: C; 70.54, H; 5.92, S; 23.54 Found: C; 70.10, H; 6.05, S; 22.68

IR: $\nu_{C-H}$=2850, 2910, 2960 cm$^{-1}$
$\nu_{C=C}$=1380, 1475, 1590 cm$^{-1}$
$\delta_{C-H}$=880 cm$^{-1}$.

Example 2

In an oxygen atmosphere, to a solution of toluene (9.2 g) and dichlorodisulfide (3.38 g) in dichloromethane (100 ml), vanadylacetylacetonato (0.27 g), trichloromethanesulfonic acid (0.15 g) and trifluoroacetic anhydride (10.5 g) were added and reacted at 30° C. for 40 hours, followed by purification to obtain poly(2-methylphenylene sulfide) (4.82 g). Melting point: 153° C.

Elemental analysis (%): Calculated: C; 68.80, H; 4.96, S; 26.24 Found: C; 67.71, H; 4.98, S; 25.86

IR: $\nu_{C-H}$=2850, 2910, 2970 cm$^{-1}$ $\nu_{C=C}$=1380, 1460, 1580 cm$^{-1}$ $\delta_{C-H}$=820, 875 cm$^{-1}$.

NMR: $\delta$ (—CH$_3$)=2.35 ppm $\delta$ (phenyl)=7.15 ppm.

Example 3

In an atmospheric environment, a solution of p-dimethoxybenzene (1.38 g) and dichlorodisulfide (2.03 g) in nitrobenzene (30 ml) was mixed with a solution of antimony pentachloride (4.49 g) in tetrachloroethane and the mixture was stirred for 20 hours, followed by purification to obtain poly(2,5-dimethoxyphenylene sulfide) (1.54 g) as a powder. Melting point: 175° C.

Elemental analysis (%): Calculated: C; 57.12, H; 4.79, S; 19.07 Found: C; 57.61, H; 4.68, S; 19.11

IR: $\nu_{C-H}$=2830, 2930, 2976 cm$^{-1}$ $\nu_{C=C}$=1360, 1440, 1480, 1560 cm$^{-1}$ $\nu_{C-O-C}$=1180, 1205 cm$^{-1}$ $\delta_{C-H}$=860, 820 cm$^{-1}$.

Example 4

In an atmospheric environment, a solution of dichlorodisulfide (1.34 g) in p-diisopropylbenzene (20 ml) was mixed with a solution of chloranil (1.53 g) and trifluoroacetic acid (4.56 g) in dichloromethane (20 ml) and reacted at 0° C. for 40 hours, followed by purification to obtain poly(2,5-diisopropylphenylene sulfide) (3.13 g) as a powder. Melting point: 240° C.

Elemental analysis (%): Calculated: C; 74.93, H; 8.40, S; 16.67 Found: C; 74.86, H; 8.38, S; 16.70

IR: $\nu_{C-H}$=2870, 2930, 2965 cm$^{-1}$ $\nu_{C=C}$=1368, 1420, 1465, 1520 cm$^{-1}$ $\delta_{C-H}$=840 cm$^{-1}$.

Example 5

In an atmospheric environment, durene (1,2,4,5-tetramethylbenzene) (6.7 g), dichlorodisulfide (3.38 g), vanadium pentoxide (4.55 g) and trifluoroacetic acid (5.7 g) were mixed and reacted in nitromethane (50 ml) at room temperature for 20 hours to obtain poly(2,3,5,6-tetramethylphenylene sulfide) (5.10 g) as a powder. Melting point: 240° C.

Elemental analysis (%): Calculated: C; 73.12, H; 7.36, S; 19.52 Found: C; 73.02, H; 7.28, S; 19.61

IR: $\nu_{C-H}$=2860, 2920, 2965 cm$^{-1}$ $\nu_{C=C}$=1390, 1405, 1465 cm$^{-1}$ $\delta_{C-H}$=870 cm$^{-1}$.

Example 6

In a nitrogen atmosphere, to a mixture of nitrobenzene (100 g), anisole (10.08 g) and sulfur (6.4 g), AlCl$_3$ (2.67 g) was added and reacted at 30° C. for 50 hours. Then, vanadyltetraporphyrine (0.03 g), trifluoromethanesulfonic acid (0.2 g) and trichloroacetic anhydride (2 g) were added and reacted at 20° C. for 50 hours, followed by purification to obtain poly(2-methoxyphenylene sulfide) (2.2 g) as a powder. Melting point: 215° C.

Elemental analysis (%): Calculated: C; 60.84, H; 4.38, S; 23.20 Found: C; 59.01, H; 3.47, S; 23.11 IR: $\nu_{C-H}$=2830, 2930, 2970 cm$^{-1}$ $\nu_{C=C}$=1480, 1560 cm$^{-1}$ $\nu_{C-O-C}$=1205 cm$^{-1}$ $\delta_{C-H}$=860, 820 cm$^{-1}$.

Example 7

In a nitrogen atmosphere, a solution of diphenyl ether (8.51 g) and dichlorodisulfide (2.70 g) in dichloromethane (100 ml) was mixed with 2,3-dichloro-5,6-dicyano-p-benzoquinone (4.54 g) and trifluoromethanesulfonic acid (0.15 g). Then, the mixture was stirred overnight. The reaction solution was dropwise added to methanol acidified with hydrochloric acid to precipitate a white product, which was separated from the unreacted materials and the catalyst by filtration, washed and dried to obtain poly(phenoxyphenylene sulfide) (8.03 g) as a white powder. Yield: 100% based on sulfur. Melting point: 170° C.

Elemental analysis (%): Calculated: C; 71.99, H; 4.00, S; 16.01 Found: C; 70.32, H; 4.15, S; 17.21

IR:$\nu_{C=C}$=1400, 1480, 1580 cm$^{-1}$ $\nu_{C-O-C}$=1240 cm$^{-1}$ $\delta_{C-H}$=825, 870 cm$^{-1}$.

Example 8

In an oxygen atmosphere, a solution of 2,2',5,5'-tetramethyldiphenyl ether (4.52 g), dichlorodisulfide (1.35 g) in tetrachloroethane (100 ml) was mixed with vanadylacetylacetonato (0.27 g), trifluoromethanesulfonic acid (0.15 g) and trifluoroacetic anhydride (10.5 g) and reacted at 30° C. for 40 hours, followed by purification to obtain poly(2,5-dimethylphenoxy-2',5'-dimethylphenylene sulfide) (5.10 g). Melting point: 217° C.

Elemental analysis (%): Calculated: C; 74.99, H; 6.25, S; 12.51 Found: C; 73.86, H; 6.33, S; 12.84

IR: $\nu_{C-H}$=2850, 2920, 2960 cm$^{-1}$
$\nu_{C=C}$=1390, 1480, 1580 cm$^{-1}$
$\nu_{C-O-C}$=1245 cm$^{-1}$
$\delta_{C-H}$=810, 865 cm$^{-1}$.

Example 9

In an atmospheric environment, a solution of 3,3',5,5'-tetramethyldiphenyl ether (1.36 g) and dichlorodisulfide (0.41 g) in nitrobenzene (30 ml) was mixed with a solution of antimony pentachloride (4.4 g) in tetrachloroethane. The mixture was stirred for 20 hours, followed by purification to obtain poly(3,5-dimethylphenoxy-2',6'-phenylene sulfide) (1.54 g) as a powder. Melting point: 250° C.

Elemental analysis (%): Calculated: C; 74.99, H; 6.25, S; 12.51 Found: C; 73.08, H; 6.49, S; 13.71

IR: $\nu_{C-H}$=2850, 2920, 2960 cm$^{-1}$ $\nu_{C=C}$=1395, 1480, 1590 cm$^{-1}$ $\nu_{C-O-C}$=1297 cm$^{-1}$ $\delta_{C-H}$=857 cm$^{-1}$.

Example 10

To a solution of dichlorodisulfide (1.34 g) in diphenylsulfide (20 ml) was mixed with a solution of chloranil (1.53 g) and trifluoroacetic acid (4.56 g) in dichloromethane (20 ml) and reacted in a closed system at 50° C. for 40 hours, followed by purification to obtain poly(phenylene sulfide) (2.79 g) as a powder. Melting point: 240° C.

Elemental analysis (%): Calculated: C; 66.65, H; 3.70, S; 29.65 Found: C; 65.63, H; 3.88, S; 30.79

IR: $\nu_{C=C}$=1390, 1440, 1475, 1570 cm$^{-1}$ $\delta_{C-H}$=815 cm$^{-1}$.

Example 11

In tetrachloroethane (50 ml), diphenyldisulfide (3.72 g), dichlorodisulfide (2.02 g), iron powder (5.6 mg) and silica gel (0.30 g) were mixed and reacted at room temperature for 20 hours, followed by purification to obtain poly(phenylene sulfide) (4.63 g) as a powder. Melting point: 282° C.

Elemental analysis (%): Calculated: C; 66.65, H; 3.70, S; 29.65 Found: C; 66.10, H; 3.61, S; 29.22

IR:$\nu_{C=C}$=1390, 1440, 1475 cm$^{-1}$ $\delta_{C-H}$=815 cm$^{-1}$.

What is claimed is:

1. A process for preparing a polyarylene thioether comprising the step of oxidatively polymerizing an aromatic compound of the formula:

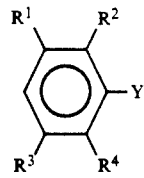
(I)

where $R^1$, $R^2$, $R^3$ and $R^4$ are independently a hydrogen atom, a halogen atom, a lower alkyl group or a lower alkoxy group, and Y is a hydrogen atom or Y is a group of the formula:

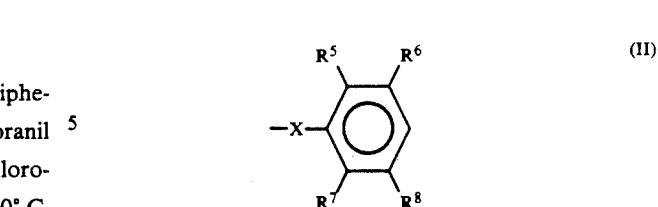
(II)

wherein $R^5$, $R^6$, $R^7$ and $R^8$ are independently a hydrogen atom, a halogen atom, a lower alkyl group or a lower alkoxy group and X is —O—, —S—, a methylene group or an ethylene group with a sulfidizing agent halogenated sulfur compound in the presence of an acid and an oxidizing agent at a time and a temperature sufficient to effect such polymerization and to produce said polyarylene thioether.

2. The process according to claim 1, wherein said oxidizing agent is at least one agent selected from the group consisting of quinones and vanadium pentoxide.

3. A process for preparing polyarylene thioether comprising oxidative polymerizing the compound of the formula (I) with a halogenated sulfur compound sulfidizing agent in the presence of an acid, a catalyst for oxidative polymerization and oxygen.

4. The process according to claim 3, wherein said oxidative polymerization catalyst is a vanadyl compound.

5. A process for preparing polyarylene thioether comprising oxidative polymerizing the compound of the formula (I) with a halogenated sulfur compound sulfidizing agent in the presence of a Friedel-Crafts catalyst.

6. The process according to claim 5, wherein said Friedel-Crafts catalyst is antimony pentachloride.

7. A process according to claim 1 wherein the oxidative polymerization is carried out at a temperature range of −25° C. to 250° C.

8. A process according to claim 7 in which the molar ratio of the oxidizing agent to the smaller amount of the aromatic compound or the sulfidizing agent in the polymerization reactive system is from 0.1 to 50.

9. The process according to claim 3 wherein the oxidative polymerization is carried out at a temperature range of −25° C. to 250° C.

10. A process according to claim 9 in which the molar ratio of the oxidizing agent to the smaller amount of the aromatic compound or the sulfidizing agent in the polymerization reactive system is from 0.1 to 50.

11. The process according to claim 10 wherein the molar ratio of the oxidative polymerization catalyst to the smaller amount of the aromatic compound (I) or the sulfidizing agent in the polymerization reaction system is from 5 to 0.00001.

* * * * *